Figure 1:
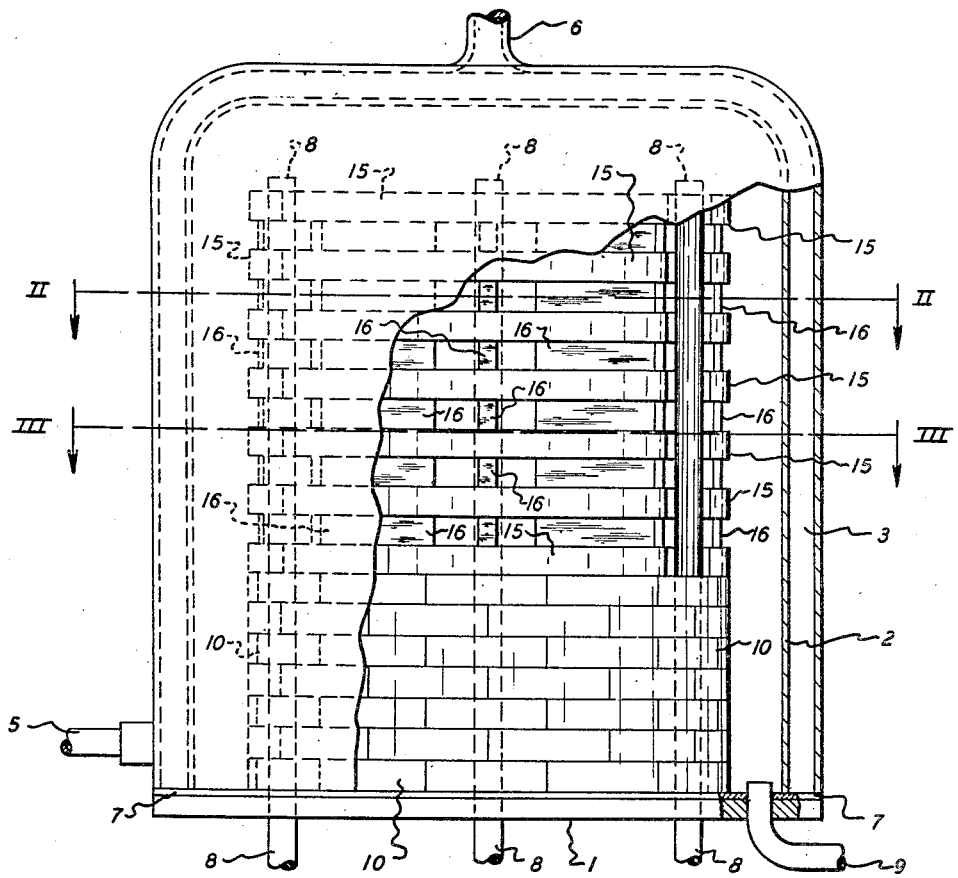

Dec. 17, 1946.    S. E. HYBINETTE ET AL    2,412,582
APPARATUS FOR PRODUCING OR PURIFYING METALS OR COMPOUNDS
Filed Oct. 9, 1942    3 Sheets-Sheet 1

Inventors
SVEN E. HYBINETTE
and FRANCIS C. CARY
By Beaman & Langford
Attorneys

Dec. 17, 1946. S. E. HYBINETTE ET AL 2,412,582
APPARATUS FOR PRODUCING OR PURIFYING METALS OR COMPOUNDS
Filed Oct. 9, 1942 3 Sheets-Sheet 3
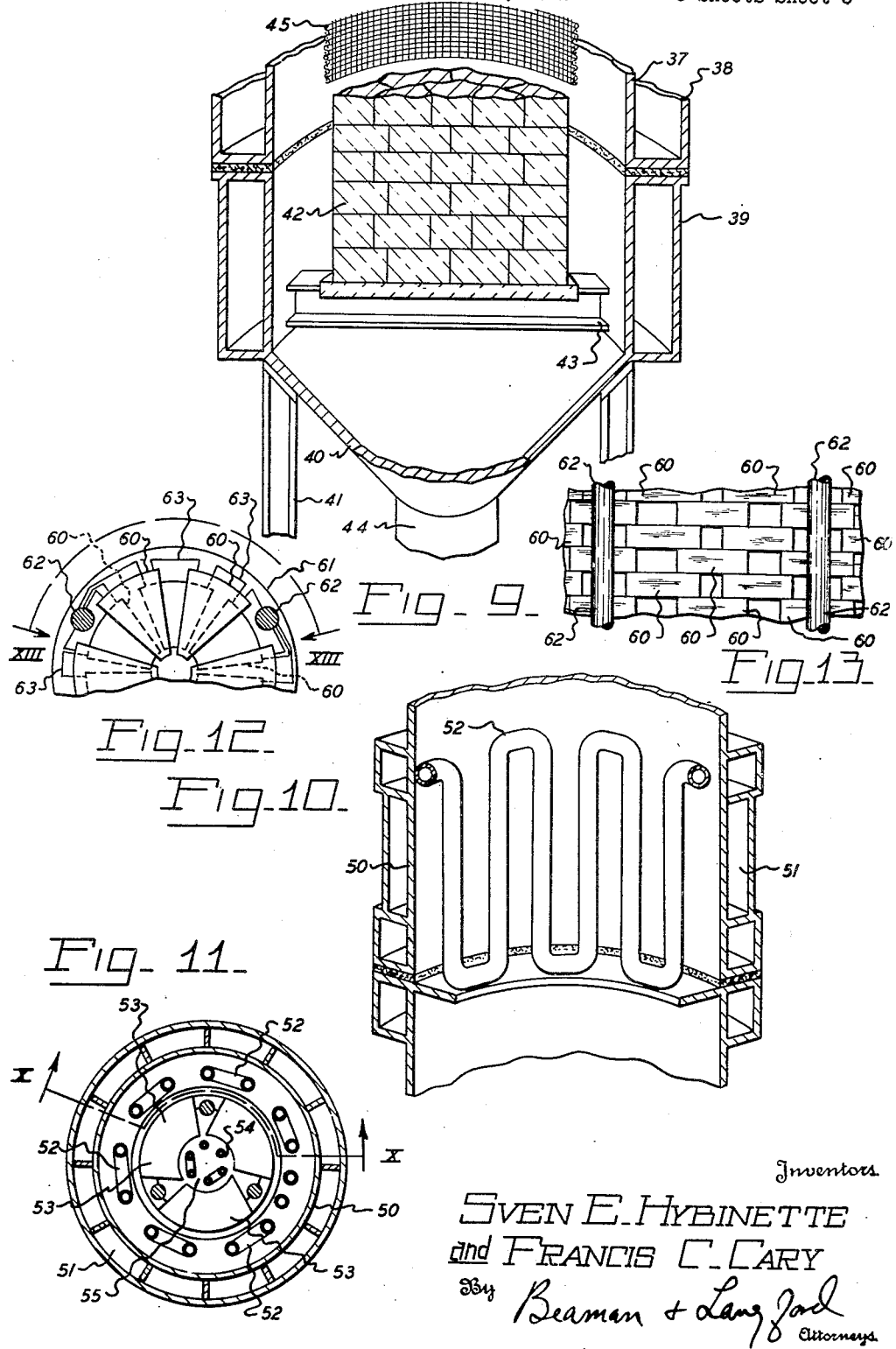
Inventors.
SVEN E. HYBINETTE
and FRANCIS C. CARY
By Beaman + Langford
Attorneys Patented Dec. 17, 1946

2,412,582

UNITED STATES PATENT OFFICE 2,412,582

APPARATUS FOR PRODUCING OR PURIFYING METALS OR COMPOUNDS

Sven E. Hybinette and Francis C. Cary, Wilmington, Del.

Application October 9, 1942, Serial No. 461,468

7 Claims. (Cl. 13—8)

This invention relates to an improved furnace to produce or purify metals or compounds by a reaction and distillation or by distillation alone.

The temperature used to reduce several metals from the mineral in vacuum is at or above their boiling points corresponding to the pressures used and they are produced as vapor and recovered by sublimation or condensation. The fundamental laws covering such reactions are recited because confusion seems to exist concerning them.

For each definite temperature of these reactions, there is a corresponding pressure of the vapors produced at which equilibrium exists. Only by reducing the vapor pressure below the equilibrium pressure, will the reaction proceed. The speed of the reaction increases directly with the reduction of this vapor pressure. The rate at which energy can be supplied to the reaction at a given temperature is increased in proportion to the reduction of the vapor pressure. Except when varied by a chemical or physical change in one or more of the materials, the equilibrium pressure increases rapidly with increase of the temperature. The equilibrium pressure of the metal vapors produced by the reaction over the reaction is a partial pressure and is independent of any other gases or vapors present and is a function of the temperature only. Removal of the vapors faster than energy is supplied to the reaction lowers the temperature. Supplying energy to the reaction in excess of that removed with the vapors increases the temperature of the reaction and increases the pressure of the vapors required to reach equilibrium.

Confusion as to the function of the vacuum also exists. Vacuum reduces the boiling point of the metal. Other gases or vapors present would interfere with removal of the vapors produced and would pile up over the condenser and interfere with the condensation of the vapors produced. Other gases or vapors might react with the vapors produced. It is for these reasons that these reactions are carried out in vacuum.

The flow of the gases varies as the square root of the pressure divided by the resistance to the flow of the vapors, whether the resistance is due to other gases present, increased velocity due to restricted area through which the vapors must pass, length of pass, change in direction of path, reduced condenser area or interference with condenser effect.

All known devices have, and necessarily by their construction have, very high resistance to vapor flow which has imposed severe limitations on the reactions and materials available for it.

These reactions have been carried out in externally heated retorts. The materials to be reacted are ground, mixed and pressed into briquettes and placed in the retorts. Such retorts have condensers at one or both ends. The retorts must necessarily be small to withstand the pressure outside due to the high vacuum maintained inside, and because the retort materials have little strength at the high temperature used. The condenser with such retorts must necessarily be small, because as much surface of the retort as is possible must be exposed to absorb heat and because part of the surface is effectively cooled by the condenser which is sealed to it to permit drawing of the vacuum. The retort may be considered as having three zones, in one of which is the condenser. Farthest therefrom would be the zone containing the briquettes to be heated and reacted. Intermediate is a zone too cold for the reactions because of the heat conducted from it by the condenser, but of sufficient length to permit the heated zone to reach the reaction temperature. The vapors are produced by the reaction in the zone with the briquettes, pass through the tortuous path through the briquettes, through the intermediate zone, each of which is of small cross-sectional area, and have to be deposited upon the condenser for the reaction to proceed. One pound of the metal vapor at the temperature and pressure would have very large volume, some times in excess of one million cubic feet per pound, and velocities of ten miles or more per minute. Such apparatus is effective to reduce the vapor pressure over the reaction only slightly and the back pressure necessary to create these speeds so depresses the reaction that it is exceedingly slow and the production is small. Such retorts are usually made of nickel chromium steel which is expensive and puts definite limitation on the temperature supplying heat to the reaction. The highest temperature possible is used to increase the equilibrium pressure, but these high temperatures shorten the limited life of such retorts and result in increased expensive replacement. The briquettes are relatively poor conductors of heat and usually are more of a heat insulator when reacted. The path of heat conductivity from the retort through the briquettes is devious so that energy can be supplied to the point of reaction only with high temperature gradient or very slowly and only part of the charge is simultaneously reacting. The heat is not uniformly distributed throughout the charge, partly due to the poor conductivity of the material, and partly due to the difficult path of heat travel. Consequently, parts of the charge are never reacted and the yield is low. Quite often a large amount of excess reducing agent has to be used in order to generate enough pressure throughout the reaction. This is particularly the case when magnesium is produced in a furnace as described by reacting burnt dolomite with ferrosilicon. 75% ferrosilicon has to be used in the reaction. The ferrosilicon is reduced to 54% grade and still contains enough silicon to represent an excess of 40%.

Either method, the use of high temperature or excess reducing material, adds seriously to the cost of the operation. The heat loss by conduction along the walls of the retort to the condenser is usually several times that conducted to the briquettes because the walls usually have a coefficient of heat conductivity more than twenty times that of the briquettes and a temperature difference of about 2000° F. between the hot zone and condenser. Because of these and other disadvantages, production of metal in such retorts is very slow, the investment cost and labor cost is very high, the replacement cost is excessively high and the thermal efficiency is very low, the yield is low, excessive reducing agent is used and wasted, and the metal is contaminated because of the long time required in which other materials are slowly vaporized.

Other retorts have been used extending the condenser into the retort based upon the well known theory that effectiveness of the condenser is proportional to the area. Although these attempts have succeeded in slightly increased production they are accompanied with greater destruction of retorts due to thermal strains and lower thermal efficiency and in general have been abandoned.

Other methods have been proposed and the high frequency furnace has been used. One such method proposes spreading the material thinly over a surface heated from above by radiant heat from carbon or silicon carbide resistors and surround the heating chamber with refractory to protect an outside jacket which resists the pressure due to the vacuum inside. Others propose using carbon in the charge as resistors both for high frequency current and as ordinary resistance.

All of these methods can produce reaction temperatures higher than the retort described with corresponding increase in equilibrium pressure, but none have or can reduce the pressure over the reaction to approximate the vapor pressure at the condenser. The difference between the equilibrium pressure and the reduced pressure which causes the reaction to proceed will be called the pressure drop. With the prior art retort described, the pressure drop is only about 1% of the equilibrium pressure. The flow of vapors varies as the square root of the pressure and the flow of vapors is only .005 of what it would be if the pressure were reduced to approximate that of the condenser. Most of the other methods mentioned, have interposed greater resistance to the flow of vapors from the reaction to the condenser and all are limited as to effective condenser area and all have a pressure drop about the same as that of the prior art retort or less. If the temperature could be raised so that the equilibrium pressure is six times that of the described retort, which is about the maximum possible, the flow of gases to the condenser would be increased to 2.445 times that of the retort, but if the pressure could be dropped to approximate that at the condenser without raise in temperature, the speed of reaction would be increased about 20 times and would not have the disadvantage of higher temperatures, greater contamination of the product by evaporation of impurities, carbide formations and other disadvantages. With the higher temperature and such pressure drop, the reactions would be accelerated about 49 times. This calculation is not accurate, but it does show the relative importance of a lowering of the resistance to flow as compared to an increase of the reaction temperature.

We have overcome the prior art difficulties by a new and improved type of furnace as described herein. The furnace has a base and pedestal, the latter of insulating refractory material. Briquettes of the material to be reacted are made in large flat slabs. Resistors are imbedded in these briquettes to supply the energy thereto. The briquettes are stacked upon the pedestal, but are spaced apart to allow large space for the flow of the vapors out of the briquettes. A hood comprising the outside walls and roof of the furnace is placed over and around the pedestal and briquettes and makes a gas tight seal with the base and encloses the entire furnace. The walls and roof of the hood are water cooled so that the entire enclosure of the furnace, except the base is the condenser. The condenser therefore has the largest dimensions of the furnace.

The resistors are spread evenly throughout the briquettes and are connected to electrodes brought up through the bottom. Current is passed through the resistors which heats the entire charge evenly throughout thereby utilizing the entire area of all briquettes at all times to discharge the vapors produced. Thus the area of all surfaces of the briquettes are simultaneously active providing maximum area at all times for vapor discharge. These vapors have free passage between the layers of briquettes direct to the condenser. The distance is short because there is no intermediate zone to be traveled. The condenser of maximum area is thus placed to be most effective. In these ways, the pressure of the vapors produced over the reaction tends to be reduced to approximately that of the metal condensed upon the condenser and the reaction is greatly accelerated. In fact, reactions have been thus made to proceed at rapid rate at temperatures below that heretofore possible, and production has been made at a rate several hundred times that of retorts of like cost. The resistor is supported by the briquettes and needs no mechanical strength and can be operated at any desired temperature, even in the molten state. For most of these reactions, a resistor of low carbon steel or iron is preferable, because of its high melting point and low cost. It is used in thin wide strips to provide large area of contact to dissipate the heat to the briquettes. It is possible to operate at temperatures more than 700° F. higher in the briquette with these resistors than with retorts and as high or higher than the other methods mentioned and the reaction then proceeds with explosive speed. The heat is thus distributed throughout the entire charge with little temperature gradient between the resistor and the charge.

The pedestal insulates the flow of heat from the charge to the base of the furnace and is usually covered with briquettes without resistors.

Such briquettes absorb the heat conducted downward and little is conducted to the pedestal. A vacuum is drawn in the furnace and consequently because of it and space between the stack of briquettes and the inside of the hood, there is substantially no heat transmitted by conduction or convection from the charge to the hood. The effect of radiant heat on the hood is minimized due to the fact that the resistor is embedded in the briquettes and thus at the beginning of a run the edges of the briquettes adjacent the hood become heated last. By the time these edges become sufficiently heated to give off much radiant heat, the inside walls of the hood are covered by bright reflecting condensed metal which acts as an effective reflector of such radiant heat. Other than unavoidable loss absorbing the heat to effect condensation, the total heat loss from our furnace has been found to be less than 10%.

In some of these reactions the charge contains other metals which may be reduced and small amounts vaporized to contaminate the metal desired. It has been found that the main reactions can be carried out rapidly at lower temperature as before stated. Both speed and lower temperature are effective in reducing the vaporization and contamination by such other metals.

The even distribution of heat throughout the charge is effective in carrying the reaction to completion evenly throughout the charge with the lowest back pressure of the vapors being released from the charge. Likewise, the depressing effect of 50% ferro silicon as against the 75% which has made the former unsuitable in the prior art retorts to effect reduction of ores, magnesium ores in particular, is not sufficient to depress the reaction when coupled, according to the present invention, with the large reacting surface and large condensing surface and large free area for passage for the vapors which our furnace provides. Thus, lower cost reducing agents can be utilized to advantage.

It is necessary in the prior art retorts and devices described to use 75% ferro silicon for calcined dolomite and the reaction will proceed, if the materials are pure and no bond exists between the MgO and CaO, until a 54% silicon remains, which is discarded with the residue adding expense to the operation, and it has not been possible even at the higher temperature with the limited pressure drop to make the reaction proceed. The constitutional diagram for iron silicon shows that the free silicon in the highest silicon iron-silicide eutectic has been consumed and no further silicon can be supplied until this silicide is decomposed, which is impossible with these devices. Likewise, a depression in the equilibrium pressure due to changes caused by calcining at a temperature above the dissociation temperature of the carbonate is effective in slowing the reaction to where it is almost imperceptible. The effective pressure drop of our furnace herein described has made it possible to react substantially all of the silicon and decompose each of the silicides and to reduce the calcined dolomite regardless of the bond described.

No part of the furnace is exposed to high temperature except the electrodes which may be lightly water cooled if need be. The hood comprising the water cooled walls and roof operate at low temperature. Also the base is protected by the insulated pedestal. No part of the furnace is destroyed or injured by its operation. There is no loss through replacement. Likewise there is no limit to size and larger furnaces can be handled with large charges with less labor cost.

Without repetition it is apparent that the advantages described apply with equal effect when metal is vaporized in vacuum and condensed to effect recovery of such metal such as aluminum or magnesium metal contained in drosses and like material.

One or more condensers at different regulated temperatures may be used in the furnace to make separation of metals by separate condensations.

We will summarize the advantages of our invention: we are able to produce metal by reaction and distillation and also by distillation alone at a much accelerated rate at all temperatures; we can use higher temperatures and speed the reaction to a higher rate; we can regulate the rate to produce metal of higher purity; we can purify the metal by making separate condensations; the efficiency is higher; the energy required is far less; only ordinary steel is required in the construction; the investment cost for like production is reduced about 90%; labor and other costs are lower including cost of reducing agent which in many reactions is the highest item of cost, except retort replacement, which latter cost is eliminated. We are able to collect the metal in any state of subdivision from a fine powder to a solid mass. Some metals may be recovered in the liquid state.

Our invention has for its object to provide a vacuum furnace for and a method for the production, purification or distillation of metals or compounds that can be operated with great economy and speed over a wide range of temperatures and conditions, and which will not have serious limitations as to size, investment and operating costs, and wear.

Another object of the invention resides in the method of using iron as a heating element in furnaces of the character described and in the manner described.

Still another object resides in the method of arranging briquettes for reaction in a furnace of the character described.

Figure 2:
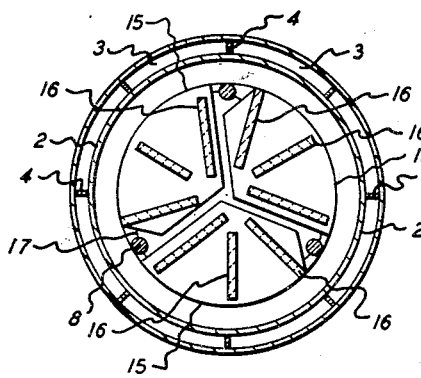
Figure 3:
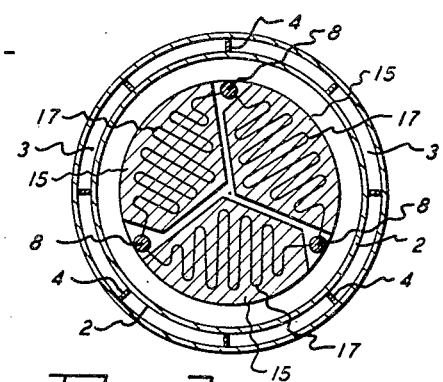
Figure 4:
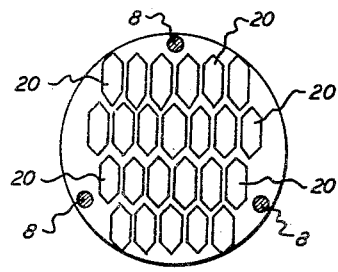

These and other objects residing in the arrangement, combination and construction of the parts and in the methods described will be apparent from the following specification when taken with the foregoing disclosure and the accompanying drawings, in which Fig. 1 is a diagrammatic elevation of a furnace constructed in accordance with the invention, having a portion of the outer hood thereof broken away to show the details of arranging and stacking briquettes of substances for reaction, Fig. 2 is a section on the line II—II of Fig. 1, showing the spacers for the stacked briquettes, Fig. 3 is a section on the line III—III of Fig. 1, showing the method of arranging resistor heating elements within the briquettes and the connections between the heating elements and the electrodes, Fig. 4 is a diagrammatic elevation of briquettes arranged in a different manner from those disclosed in Figs. 1, 2 and 3.

Figure 5:
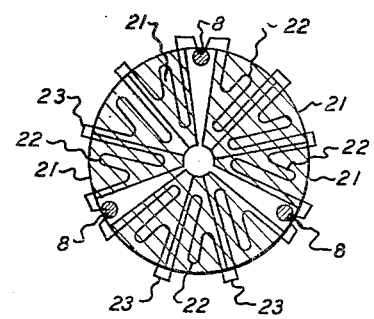
Figure 6:
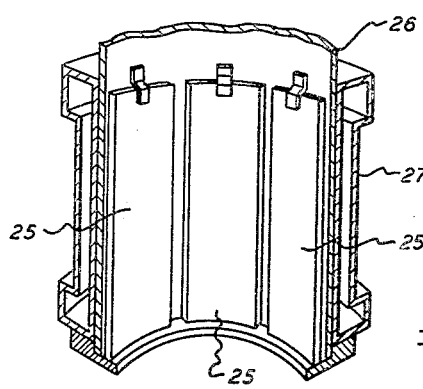
Figure 7:
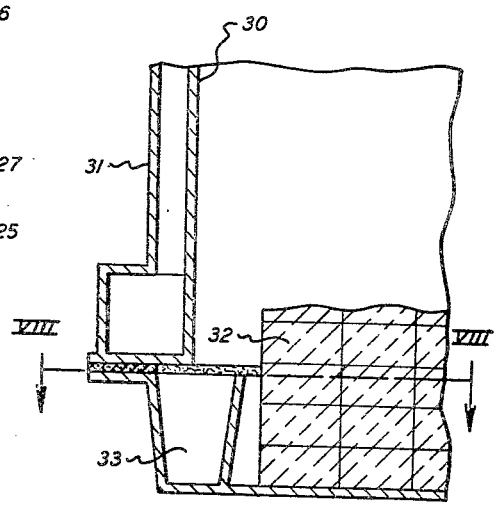
Figure 8:
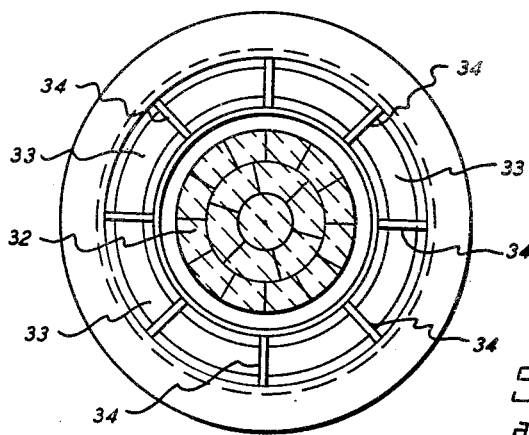

Fig. 5 is a diagrammatic illustration of another form of briquette arrangement,

Fig. 6 is a diagrammatic perspective view of a portion of a furnace showing condensing liners, Fig. 7 is a partial sectional view of a furnace showing a diagrammatic arrangement for collecting distilled metal in pig molds, Fig. 8 is a section on the line VIII—VIII of Fig. 7, Fig. 9 is a vertical section of another form of furnace showing diagrammatically an arrangement for collecting distilled metal in the form of a powder, Fig. 10 is a section on the line X—X of Fig. 11 disclosing a multiple condenser furnace wherein an intermediate condenser in the form of a pipe is arranged between the briquettes and the condensing wall of the furnace, Fig. 11 is a diagrammatic vertical section of a furnace having a multiple condenser corresponding to Fig. 2, Fig. 12 is a partial plan view of a briquette stack wherein layers of briquettes serve as spacers between layers, and Fig. 13 is a developed side view of the stack of Fig. 12 taken on the line XIII—XIII of Fig. 12.

Referring particularly to the drawings, reference character 1 indicates the base plate of a furnace having a hood 2 provided with a water jacket 3. The water jacket 3 is provided with vertical dividers 4 to cause cooling water to flow in a vertical direction, and with an inlet pipe 5 and an outlet pipe 6. The hood 2 is hermetically sealed to the base 1 by a lead gasket 7. Suitable securing means, not shown, are provided.

The furnace is internally heated by resistors, hereinafter described, heated by current passing through electrodes 8. The electrodes 8 are suitably hermetically sealed in the base 1 to permit the drawing of a vacuum within the hood 2 through an exhausting conduit 9.

Arranged on the base 1 is a pedestal 10 made up of some refractory material, such as refractory bricks, and the pedestal 10 supports a stack of briquettes 15. The briquettes 15 are made of the material to be reacted combined with a reducing agent to provide any of the reactions herein described. The briquette material is powdered, mixed and compressed into briquettes in suitable slabs to fit into the furnace. In a form of the furnace which has been operated, the briquettes were arranged to provide a 40" circle. In stacking the briquettes 15, a layer of briquettes 15 is placed directly upon the top of the pedestal 10, and additional layers of briquettes 15 are spaced by spacers 16, shown particularly in Figs. 1 and 2. The spacers may take any suitable form, although it has been found that spacers of about 1½" high, 1" wide, and of length varying from 4" to 18" are highly satisfactory. The spacers 16 may be of a suitable refractory or of broken pieces of briquettes 15. Ordinarily the briquettes 15 are slightly spaced as shown to permit the passage of vaporized metal therebetween.

The electrodes 8 are three in number arranged for three phase current. For single phase current two electrodes could be used. For large furnaces multiples of groups of electrodes may be used and may be connected in series or parallel for current regulation. The briquettes 15, as illustrated in Figs. 1 through 3, are shaped to permit the passage of the electrodes 8 through the outer edge of the briquette stack. Heating resistor elements 17, shown particularly in Fig. 3, preferably are embedded in the briquettes 15 at the time they are molded. The resistors 17 are connected to the electrodes 8 and usually consist of thin soft steel or iron ribbon. The ribbon may be pressed into the briquettes if desired and is spaced to effect a uniform heating with a short heat travel to every part of the briquette. It is made thin to provide large areas for heat transmission to the briquettes so that small temperature difference is required to transmit heat. In the example illustrated, the resistor is about .012" x ¾" x 45' for each briquette, and the briquettes are about 1½" thick. Preferably at the joints between the resistors 17 and the electrodes 8, the resistors are doubled. It has been found that a resistor spacing of about 1" is satisfactory. It will be understood that each layer of briquettes 15 is provided with resistors so that the briquettes 15, except those immediately on the top of the pedestal 10, are heated uniformly throughout. It is not critical that the resistors be embedded in the briquettes 15, and in some cases they may take the form of a grid laid over the briquettes 15. Furthermore other materials than iron or steel may be used for the resistors 17. However, it has been found that soft steel or iron is entirely satisfactory and may be operated even above its melting point of 2750° F. when the briquettes are sufficiently refractory to hold the resistors in position.

In operation of the form of the invention disclosed in Figs. 1 through 3, the hood 2 is lifted from the furnace and the briquettes 15 and spacers 16 are placed on the pedestal 10. The resistors 17 are attached to the electrodes 8 and the hood is replaced over the furnace, sealing the same by the gasket 7. A vacuum is then drawn through the exhausting conduit 9 and cooling water is circulated through the jacket 3, the cooling water entering the pipe 5 and leaving by the pipe 6. Electricity is supplied to the resistors 17 through the electrodes 8 for furnishing energy for the reaction and vaporization. The vapors produced, flow to the inside surface of the hood 2. When the reaction is near completion, which is indicated by a quick rise in temperature, the current is disconnected and the furnace allowed to cool. After the current has been disconnected there is sufficient heat stored in the charge to continue the reaction to completion. When the charge and metal produced are cooled, so that no objectionable oxidation will take place upon exposure to the air, the vacuum is released, the hood 2 removed and the condensed metal removed from the hood. The old charge is removed and a new charge of briquettes 15 is set in the furnace and the cycle repeated.

In the form of the invention disclosed, no cooling of the electrodes 8 has been indicated. However, at elevated temperatures it is preferable to make the electrodes hollow and insert a water cooled copper tube to effect a slight cooling of the inside of the electrodes so that they will not bend under such elevated temperatures. A copper tube type of cooler is preferable so that it can be removed for cleaning should scale deposit from the water.

The drawings do not disclose insulation on the outside of the hood. With a water coolant, which would cause condensation from the atmosphere on the outside, it is preferable to put on an insulation jacket to avoid such condensation. The gasket 7 has been referred to as consisting of lead. However, it has been found that aluminum, rubber or other materials suitable to make such a gasket may be used. It is noted that the gasket 7 is cooled by the water jacket 3. Likewise, water jackets, not shown, may be employed to cool the seal around the electrodes 8.

Figs. 4 and 5 illustrate alternative forms that the briquettes may take. In Fig. 4 the briquettes 20 are hexagonal in shape. The resistors are not shown, but preferably are laid in slots, straight from one briquette to the other, and are connected to the electrodes 8. In Fig. 5 the briquettes 21 are pie shaped and have embedded resistors 22 corresponding to the resistors 17 of Fig. 3. It will be noted that there are more briquettes 21 than there are electrodes 8. Accordingly, the resistors 22 of the briquettes 21 are connected together at a plurality of connection points 23 at the junctions between briquettes not adjacent the electrodes 8. In the briquettes in both Figs. 4 and 5. it will be understood that the briquettes are stacked in a manner corresponding to the stacking of the briquettes 15 of Figs. 1 through 3.

The furnace according to the present invention is subject to various modifications. For example, the furnace may be horizontal or inverted or otherwise instead of in the vertical position shown. Furthermore the rate of condensation determines the size of crystals formed. Accordingly, by varying the rate of condensation by regulating the input of current or regulating the temperature of the condenser or both, the metal condensed may be in the form of amorphous powder, crystalline powder, small or large crystals, or solid metal. The temperature of the condenser can be varied by varying the flow of the coolant, by inserting removable liners 25, see Fig. 6, such as, for example, are shown in the hood 26 of the furnace, which is provided with a cooling jacket 27. The effect of the liners 25 may be varied by spacing them from the condenser which is the inner wall of the hood 26 or by providing the liners 25 with reflecting surfaces, which surfaces are spaced with respect to the liners 25 and the condenser. Further variations may be provided by employing insulation between the liners 25 and the hood wall 26. The rate of condensation may be varied also by the employment of an inert gas in the furnace.

Figs. 7 and 8 disclose a furnace variation, the briquette stacks being omitted from the drawings for clarity of illustration, wherein a furnace hood 30 is provided with a cooling jacket 31, and a pedestal 32 for supporting the briquette stack. Pig molds 33 are provided beneath the hood walls 30, which as explained with respect to Figs. 1 through 3, constitute condensing walls. The pig molds 33 are separated by spacers 34, for defining side walls. The pig molds 33 are filled by effecting melting of the metal condensed on the hood walls 30 by stopping the flow of coolant when the reaction is completed, so that the residual heat in the charge will heat up and melt the condensed metal. Alternately the metal may be condensed by controlling the condensation, directly into a liquid state, and run from the furnace.

Fig. 9 discloses a form of the furnace for collecting the condensate in the form of a powder. In this form of the invention the furnace is provided with a top hood 37 having a water jacket 38. A lower water jacket 39 forms the upper portion of a hopper 40 for collecting the powdered magnesium or other metal, which has been condensed. The hopper 40 is supported by a steel framework 41, and the pedestal 42 supporting the briquette stack, not shown, is supported by a steel frame 43. At the bottom of the hopper 40 is provided a suitable valve 44, not shown, for controlling the removal of the powdered condensed magnesium and for sealing the interior of the furnace. In condensing the magnesium in the form of powder, it is advantageous to provide a vibrating arrangement not shown for shaking the powder from the condensing wall. In distilling certain metals, dust is carried up by the velocity of the vapors, which dust would contaminate the product. In such cases it is advantageous to surround the charge with a filter 45 as shown in Fig. 9, to remove such dust from the vapors before they reach the condenser.

Figs. 10 and 11 illustrate a form of the invention wherein several condensers are employed. The furnace hood 50 is provided with a cooling jacket 51. It will be understood that the interior surface of the hood 50 comprises one condensing surface. Spaced inwardly from the condensing surface comprised by the interior wall of the hood 50 is an undulating pipe 52 which constitutes a second condenser. The pipe 52 is arranged between the briquette stack built up of the briquettes 53 and the condensing wall of the hood 50 shown particularly in Fig. 9. A third condenser 54 in the form of an undulating pipe and corresponding generally to the condenser 52 is arranged within the center of the briquettes 53 which are shaped to provide a central well 55. It will be understood that a multiple condenser system such as disclosed in Figs. 10 and 11 may be operated with the condensers at different temperatures, thereby condensing different vapors which have different condensing points, should the furnace be operated to vaporize more than one metal. Such operation is particularly adaptable when the inner condenser 54 is not used. Obviously, additional condensers may be inserted if desired, condensing at still different temperatures. In practice, the central condenser 54 may be omitted and the briquette form of Figs. 1, 2 and 3 used if so desired.

Figs. 12 and 13 disclose an alternative form of briquette stack structure, wherein the briquettes themselves serve as spacers. As shown, briquettes 60 are stacked on a pedestal 61 and are arranged in groups between the electrodes 62. The briquettes 60 are arranged in a checkerwork pattern, as will be clear from the drawings, so as to provide air passages between all of the briquettes 60 to permit the flow of vapors between them. Preferably the briquettes are heated internally by resistance heating elements 63 corresponding to the resistance heating elements 17 disclosed in Fig. 3. The heating elements 63 are secured to the electrodes 62.

While the aforementioned embodiments of the invention have been referred to as having jackets cooled by water, it will be understood that cooling may be effected by other cooling agents such as other liquids or gases or by radiation. While no structure has been shown for regulating the flow of current to the heating resistors, it will be understood by those skilled in the art that such regulation may be suitably arranged. Though magnesium has been particularly referred to as one of the products obtainable according to the present invention, it is to be understood that the invention is not so limited and that by the use of appropriate reaction substances, elements such as lithium, calcium, sodium, potassium, zinc, aluminum, manganese and other metals with reasonably high vapor pressures at temperatures below that of the melting point of the resistor used, may be obtained. Likewise many substances other than elements may be produced or purified by the use of this furnace, thus, for example, lithium chloride may be produced by the reaction of sodium chloride on spodumene in this furnace, or iron in bauxite may be removed by treating bauxite in this furnace with sodium chloride.

While the foregoing specification has made reference to condensing vapors to obtain the substances desired, it will be understood that substances may be obtained equally well by sublimation depending upon the characteristic of the substances involved. Furthermore, the described and illustrated embodiments of the invention are to be construed as descriptive and not as limitations or restrictions on the general principles involved.

Having thus described our invention, what we desire to secure by Letters Patent and claim is:

1. In a furnace, a charge therein, said charge being arranged inwardly of the walls of said furnace, said charge comprising a plurality of briquettes stacked so as to allow free passage of gases between them, means for supplying heat to said briquettes, a condensing surface in communication with the space in which said briquettes are arranged, and means for evacuating said furnace.

2. The invention as defined in claim 1 wherein the briquettes are internally heated.

3. In a furnace, a charge arranged inwardly of the walls thereof, a condenser surrounding said charge, said charge comprising a plurality of briquettes stacked so as to allow free passage of gases between them, means within said furnace closer to said briquettes than to said condensing surface for heating said briquettes, and means for evacuating said furnace.

4. The invention as defined in claim 3 wherein the heating means comprises a resistance embedded in the briquettes.

5. In a furnace, at least one condenser, means for cooling said condenser, a charge support, said condenser surrounding a charge of briquettes above said support, resistance means for heating said briquettes, electrodes for supplying electricity to said resistance means, means for cooling said electrodes, and means for evacuating the furnace.

6. In a furnace, a charge therein, said charge comprising a plurality of briquettes stacked so as to allow the free passage of gases between them, heating resistors embedded in said briquettes for internally heating the same, at least one condenser surrounding said charge, means for sealing said furnace, and means for evacuating said furnace.

7. A furnace comprising at least one condenser surrounding briquettes internally heated, means for collecting the condensate in the molten form, and means for evacuating said furnace.

SVEN E. HYBINETTE.
FRANCIS C. CARY.